No. 646,150. Patented Mar. 27, 1900.
J. LANGTON.
ELECTRICAL CONNECTOR.
(Application filed Aug. 1, 1899.)

(No Model.)

Witnesses:
C. W. Benjamin
Geo. S. Kennedy

Inventor:
John Langton
by Wm A. Rosenbaum
atty

UNITED STATES PATENT OFFICE.

JOHN LANGTON, OF NEW YORK, N. Y.

ELECTRICAL CONNECTOR.

SPECIFICATION forming part of Letters Patent No. 646,150, dated March 27, 1900.

Application filed August 1, 1899. Serial No. 725,758. (No model.)

*To all whom it may concern:*

Be it known that I, JOHN LANGTON, a subject of the Queen of Great Britain, residing at the city of New York, in the borough of Manhattan and State of New York, have invented certain new and useful Improvements in Electrical Connections, of which the following is a full, clear, and exact description.

This invention is a means for protecting electrical connections, especially those connections which are exposed to drippings, splashings, sprayings, or a vapor-charged atmosphere, such as is the case with the connections of chemical generators and electrolytic cells.

It is a well-known fact that the exposed parts of a battery or electrolytic cell soon become corroded or covered with the salts deposited thereon by the vapors and splashings from the cell and that these salts often so fully cover the contact-surfaces of the connecting-lugs and line-terminals that any relative movement of the contacts would bring them in touch with such covered surfaces and so impair the conductivity of the connection.

To avoid this impairment of contacts is the object of my invention; and it consists in the combination of an electrical connection and a body of liquid in which the connection is submerged, said liquid being capable of dissolving such salts as those referred to above.

The invention also consists of other features, which will be more specifically pointed out in the claims.

Figure 1:
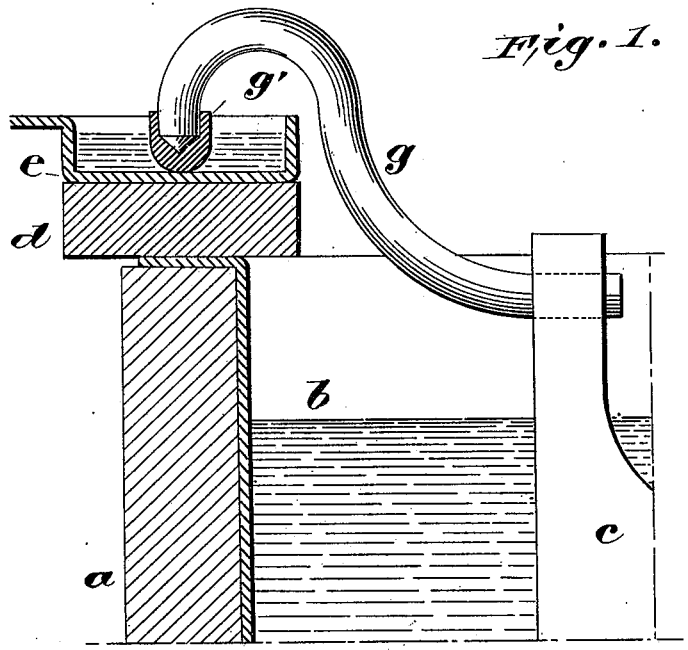
Figure 2:
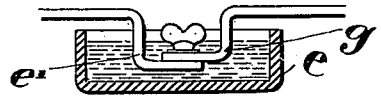

With reference to the accompanying drawings, Figure 1 is a sectional view of a portion of an electrolytic tank, showing a connection made and protected in accordance with my invention; and Fig. 2 illustrates a modification of the invention.

Referring to the drawings by letter, $a$ represents a part of a tank containing an electrolyte $b$ and one of the electrodes $c$, the other electrode not being shown. Upon the edge of the cell a bar $d$, of wood or other insulating substance, rests, and upon this is fixed a tray $e$, of copper, lead, or other suitable conducting material. This tray is the permanent terminal of one of the line conductors. It contains a quantity of water $f$ or some other liquid capable of dissolving and holding in solution any salts that may be deposited into it either from drippings, creepings, splashings, a vapor-charged atmosphere, or other source. The electrode $c$ is provided with the connecting-lug $g$, the free end of which in this instance is suitably bent to pass over the edge of the tray $e$ and into the liquid contained therein. The end of the lug, which may or may not be provided with a suitable contacting shoe $g'$, rests in mechanical contact with the bottom of the tray, the contacting points being thus submerged and surrounded by the liquid in the tray. The best liquid I have discovered so far for this purpose is water; but any liquid that will perform the same function may be used, a poorly-conducting or non-conducting liquid being preferred. It is found in practice and it will be obvious at once that the drippings, splashings, creepings, or vapors from any source that are charged with salts falling into the liquid $f$ are dissolved thereby and held in solution and prevented from being deposited upon or attacking the contact-surfaces of or the surfaces adjacent to the connections, so that in case of any relative movement of the contacts the new surfaces of contact will be free from deposits of the high-resistance material. The liquid $f$ may from time to time be drawn off or renewed to prevent saturation and deposits.

While I have illustrated the tray $e$ as the terminal of the line-circuit, it is obvious that this terminal may be led into the liquid in the same way as the lug $g$ and the connection made beneath the surface of the liquid, as shown in Fig. 2, the two terminals being indicated by $e'\ g$. It is also obvious that the tray may be formed upon or attached to either member of the connection. Likewise other forms of connection may be adopted so long as the contacting surfaces are submerged in a liquid having the qualities mentioned above.

My invention, broadly considered, comprehends the protecting of an electrical connection whether it be at the pole of a battery or electrolytic cell or elsewhere.

Having described my invention, I claim—

1. The combination with an electrolytic cell, of an electrical connection therefor consisting of two conductors in mechanical contact with each other in such position as to be subject to corrosion by the action of the electrolyte, a vessel containing a liquid capable of dissolving salts that might be deposited upon, or adjacent to, the contact-surfaces of the connection, the abutting portions of said connection being immersed in the liquid.

2. In an electrolytic cell, the combination of an electrode and its connecting-lug, a tray containing a liquid capable of dissolving salts that may emanate from the cell or other source, and a line-terminal making mechanical connection with the connecting-lug of the electrode, the points of contact being submerged in the liquid of said tray, substantially as described.

3. In an electrolytic tank, the combination of an electrode and its connecting-lug, and a metallic tray having a line-terminal and containing a liquid capable of dissolving salts that may emanate from the cell or other source, the connecting-lug of the electrode projecting into said liquid and making contact with the bottom of the tray to maintain the circuit, substantially as described.

In witness whereof I subscribe my signature in presence of two witnesses.

JOHN LANGTON.

Witnesses:
  GEO. S. KENNEDY,
  FRANK S. OBER.